United States Patent [19]

Hagedorn

[11] 4,444,712
[45] Apr. 24, 1984

[54] PROCESS FOR THE PRODUCTION OF SLIDING-THROUGH GUIDE BANDS

[75] Inventor: Klaus Hagedorn, Würselen, Fed. Rep. of Germany

[73] Assignee: Rheinmetall GmbH, Duesseldorf, Fed. Rep. of Germany

[21] Appl. No.: 197,259

[22] Filed: Oct. 15, 1980

[30] Foreign Application Priority Data

Oct. 17, 1979 [DE] Fed. Rep. of Germany ....... 2941920

[51] Int. Cl.$^3$ ........................ B29F 1/10; B29D 31/00; F42B 31/00
[52] U.S. Cl. .................................. 264/267; 264/328.1
[58] Field of Search .............. 264/127, 262, 267, 269, 264/328.1, 328.2, 328.3, 328.14, 328.16, 327, 271.1

[56] References Cited

U.S. PATENT DOCUMENTS

| 2,310,915 | 2/1943 | Hurley | 102/526 |
| 2,842,820 | 7/1958 | Brennan | 264/267 |
| 3,098,263 | 7/1963 | Campbell | 249/88 |
| 3,786,760 | 1/1974 | Feldman | 102/527 |
| 3,861,646 | 1/1975 | Douglas | 264/267 |
| 3,910,194 | 10/1975 | Dehm et al. | 102/527 |
| 4,205,036 | 5/1980 | Trame | 264/267 |
| 4,264,222 | 4/1981 | Bauer | 264/267 |

FOREIGN PATENT DOCUMENTS 2551389 11/1975 Fed. Rep. of Germany .
2408445 8/1979 France .
630414 10/1949 United Kingdom .

OTHER PUBLICATIONS

Trovinger, "Two Piece Slip-Obturator Band, Naval Weapons Center," China Lake, CA.

Primary Examiner—Willard E. Hoag

[57] ABSTRACT

A process for producing guide bands made of deformable synthetic material for flight-stabilized projectiles which are shot out of smooth and drawn gun barrels. The projectile includes an annular groove in which the guide band is mounted and from which it slightly radially projects. The process includes the steps of fixing the projectile in an injection molding device; directly injecting synthetic material into the space between the injection molding device and the annular groove via at least one slitted injection molding gate; and adjusting and maintaining a temperature gradient between the projectile and injection molding device, so that the injection molding device is substantially colder than the projectile.

4 Claims, 3 Drawing Figures

PROCESS FOR THE PRODUCTION OF SLIDING-THROUGH GUIDE BANDS

BACKGROUND OF THE INVENTION

The invention relates to a process for producing guide bands from deformable material for flight-stabilized projectiles, which guide bands are adapted to slide through the gunbarrel of a gun. The guide band of the invention is arranged in a guide band groove and is suitable for use in flight-stablized projectiles being propelled through smooth and drawn gun barrels.

The flight-stabilized projectile of this type, having guide bands adapted to slide through the gun barrel are, for example, described in German published patent application No. 2551389. The design of these known projectiles serves to reduce as much as possible the spin of the projectile, so that the projectile reaches its target with the optimal possible penetration force. It has been ascertained in practice that the use of such guide bands is accompanied with a problem, namely that the guide band must be manufactured with high precision, which applies also to the guide band groove as well as the guide band proper.

Attempts have been made to make guide bands of unitary construction, which are inserted into the guide band groove of the projectile. It is also necessary for this purpose, to split the projectile body in the region of the guide band groove, so that the guide band can be inserted in the groove prior to the joining together of the split projectile halves.

In German published patent application No. 2551389 there is disclosed a projectile arrangement, in which a projectile body of unitary construction is used. However, the guide band proper consists of several segments, which are held together by means of a transport safety mechanism. The transport safety mechanism can be constructed in different ways, for example, as a separate ring or as the cartridge housing mount of a cartridge, or also by using a sliding sleeve in which the segments of the guide band are disposed and held. The guide band itself consists of sintered metal.

Despite the fact that this known arrangement has been found occasionally satisfactory, because the guide band, consisting of a number of segments, is released and can fall to the ground after the projectile has left the muzzle of the gun barrel, nevertheless there continues to exist a need to use a guide band of unitary construction, in order to avoid in this way the necessity of manufacturing individual segments for guide bands and thereby simplifying the manufacturing process.

SUMMARY OF THE INVENTION

It is a general object of this invention to provide a process for manufacturing through-sliding guide bands of unitary construction, as well as projectiles having such guide bands, which make possible a simplification of the manufacturing process and simultaneously the utilization of a projectile body of unitary construction.

The process of the invention includes the following process steps:

Fixing of the projectile in an injection molding tool; directly injecting synthetic material as guide band material into the annular space formed between the guide band groove on the projectile, on the one hand, and the wall of the injection molding tool, on the other hand, via a plurality of the injection molding gates uniformly spaced about the periphery of the injection molding tool; and the adjustment and maintenance of a temperature gradiant between the projectile and injection molding tool, so that the injection molding tool is substantially colder than the projectile. The process of this invention advantageously achieves that a projectile body of unitary construction can be used and also a guide band of unitary construction, whereby the material of the guide band is intensely cooled at the injection molding tool. When the projectile body is released a gap is formed between the guide band and the guide band groove and thereby a sliding-through guide band is formed when the guide band reaches room temperature. Since the injecting of the synthetic material is carried out via a plurality of gates, there are formed binding seams in the mid-region between two adjacent injection gates. These binding seams possess a reduced mechanical strength and perform therefore as breaking or fracture lines for the guide band.

In accordance with a further feature of the process of this invention a heat insulation layer is formed in the guide band groove in the annular space between the injection molding tool and the guide band groove prior to the injection of the synthetic material into the annular space, so that in this manner the process can advantageously also be used when a heating of the projectile is not desirable for some extraneous reason. Preferably there is used as material for the heat insulation layer a material having good gliding properties, for example, polytetrafluroethylene can be used in order to support and improve the sliding through property of the guide band.

A flight stabilized projectile in accordance with the invention is therefore characterized by a guide band of synthetic material and unitary construction, which is directly injected into the guide band groove and is separated by means of a gap from the projectile body. The guide band is advantageously made of a material, that, at cooling, shrinks substantially in the range of the glass temperature with amorphous material or in the range of crystallization formation temperature with partially crystalline material. A suitable material is for example polyamide.

BRIEF DESCRIPTION OF THE DRAWING

These and other objects of the present invention are realized and illustrated in the several preferred embodiments as shown in the accompanying drawing in which.

DETAILED DESCRIPTION

Figure 1:
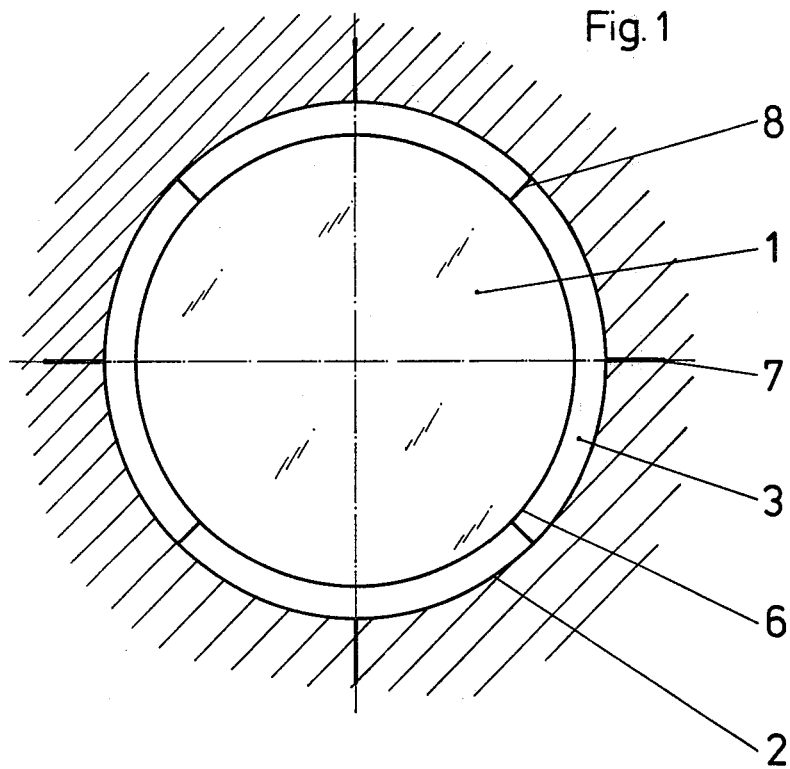
FIG. 1 is a schematic cross-sectional view through an injection molding device and a projectile disposed therein submitted for purposes of clarifying the process of the invention.

For carrying out the process of the invention for producing sliding-through guide bands, there is first of all made a guide band groove 6 in the projectile body 1 by conventional known means, such as, for example, in a machining process. The projectile body 1 is then positioned and fixed in an injection molding tool 2 as illustrated in FIG. 1. Thereby the injection molding tool 2 forms jointly with the groove 6 an annular space into which the synthetic material forming the guide band material is directly injected. This injection step can be carried out via a plurality of spot-slit-gates 7 uniformly spaced about the periphery of the injection molding tool 2, which are illustrated by means of radial lines in FIG. 1.

In this manner there is formed in the interior of the ring chamber between the guide band groove 6 and the injection molding tool 2, a unitary guide band 3. After the filling process of the injection tool 2 in which the pressure builts up, the spot-slit-gates 7 are very rapidly sealed, so that no further material can flow into the injection molding tool 2. As a result of using a plurality of spot-slit-gates 7, there is formed in the ring chamber or groove 6 between the adjacent spot-slit-gates 7 a binding seam 8, as is illustrated in FIG. 1, at which location the synthetic material for the guide band 3 flows together.

Of importance in this connection is the fact that at the locations of the binding seams 8 the guide band 3, while having the geometric shape as the remaining regions of the guide band 3, have nevertheless a reduced mechanical strength. In this fashion the binding seams 8, as desired, are acting as fracture lines for the completed guide band 3, so that the guide band 3 can be separated from the projectile body 1, as soon as the projectile leaves the muzzle of the gun barrel.

If in the described embodiment eight different spot-slit-gates 7, as well as eight binding seams 8, are provided, then this number is only to be considered as exemplary and the number of gates can be adjuted to the prevailing operative conditions. It is only necessary to take care that the spot-slit-gates 7 are uniformly spaced from each other around the periphery of the injection molding tool 2.

In order to form the slide-through guide bands 3, it is necessary to adjust the injection molding apparatus so that a corresponding temperature gradient is formed between the projectile body 1 and the injection molding tool 2, so that the injection tool 2 is substantially colder than the projectile body 1. This temperature gradient must be maintained for a sufficiently long period of time, in order to achieve the desired cooling and solidification of the guide band 3. The formation of the temperature gradient is brought about in a simple manner, in that the projectile body 1 is heated and/or the injection molding tool 2 is cooled, whereby, however, the special shape of the projectile with respect to its overall construction must also be taken into consideration. These factors make for eventual limits for the heating or absence of heating for reasons to be set forth hereinbelow, whereby a corresponding cooling of the injection molding tool 2 is then provided for the required temperature gradient.

This temperature gradient insures that the guide band 3 made out of synthetic material is predominantly cooled on the surface of the injection molding tool 2. This temperature reduction leads to a considerable reduction of the specific volume of the guide band 3. It is clear that the reduction of the specific volume per unit of time is largest in that location where the material cools most rapidly, that is in the vicinity of the surface of the injection molding tool 2.

Due to the cooling of the synthetic material in the ring chamber or groove 6 and the thereby ensuing reduction of its specific volume, the pressure in the injection molding tool 2 is also lowered, and this occurs most at the location where the largest cooling velocity is present. Simultaneously with the formation of a substantially cylindrical-symmetrical cooling velocity field within the synthetic material, which decreases in the radial direction, there is formed a corresponding, also substantially cylindrical symmetrical pressure gradient field within the synthetic material, as a consequence of which a material transport within the ring chamber occurs towards the coldest location therein, as long as the synthetic material has not yet solidified.

When this pressure within the ring chamber has decreased to the level of the ambient pressure, then, due to the afore-described mechanism, the material transport phenomena is released, which has the effect that the synthetic material contracts in the radially outer region of the ring chamber, predominantly in the radial direction. Simultaneously therewith, the material separates from the inner wall of the ring chamber, viewed from the radial direction, that is from its warmest location. In the afore-described arrangement this warmest location is the projectile body 1 respectively the root of the therein formed guide band groove 6. By means of this effect of lifting the synthetic material from the projectile surface the heat transfer between the synthetic material, on the one hand, and the projectile body, on the other hand, becomes even poorer, so that the heat stream from the synthetic material of the guide band 3 to the projectile body 1 is further lowered.

This signifies further, that the heat energy, which is contained in the radially inner region of the guide band 3, now flows substantially through the body of the guide band 3 outwardly into the injection molding tool 2, which is maintained in a cold condition, and consequently, is conducted away by it. This phenomenon leads, however, to the further advantage, that those surfaces of the guide band 3, which have no longer any wall contact with the guide band groove 6, cool very slowly. Thereby a very good smooth surface with a reduced roughness depth is obtained, which supports and enhances the sliding through of the guide band 3 mounted on the projectile body 1 when it is propelled through a gun barrel.

The afore-described process steps indicate that it is important, that the adjustment and maintenance of the temperature gradient between the projectile body 1, on the one hand, and the injection molding tool 2, on the other hand, must be carefully maintained. For this reason it is also advantageous, when fixing the projectile body 1 in the injection molding tool 2, that as small as possible a heat stream flows from the projectile 1 to the injection molding tool 2. This can, for example, be accomplished by providing only small contact surfaces between the projectile 1 and injection molding tool 2. Another possibility resides therein to provide a heat insulating layer between the projectile and the injection molding tool therein for fixing the projectile.

Figure 2:
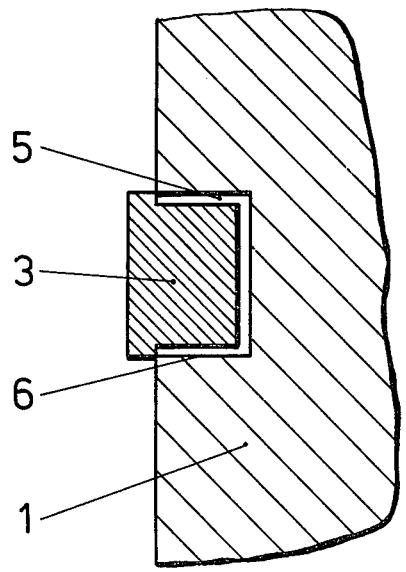
FIG. 2 is a schematic longitudinal sectional view through a projectile having a sliding-through guide band.

FIG. 2 illustrates schematically an arrangement for the afore-described process. There is shown a projectile body 1 having a guide band groove 6 as well as a guide band 3, which projects partially radially outwardly from the guide band groove 6. There is formed between the guide band 3 and the guide band groove 6 a gap 5 which has been somewhat exaggerated for the sake of clarity, and which facilitates the sliding through of the guide band when the projectile 1 is being propelled through the gun barrel.

It can become desirable for several reasons to work with the afore-described temperature gradient between the projectile body 1 and the the projection tool 2, but not to build up the temperature gradient to such magnitude, respectively heat the projectile 1 proper not at all or only very little. This can become, for example, the case when one is dealing with a finished hollow charge projectile or a projectile having pyrotechnical means or when a projectile is used with a hard Al-alloy, which permits a maximum temperature of about 135° C.

Figure 3:
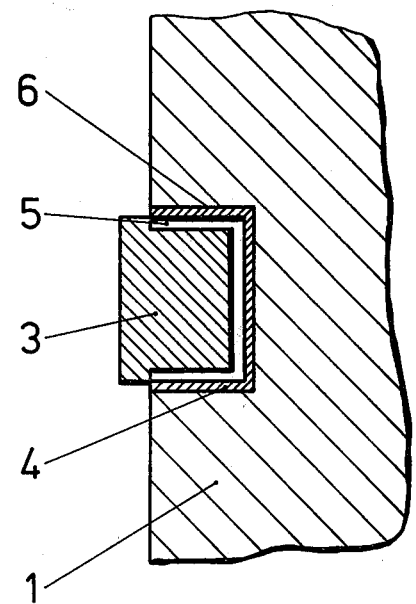
FIG. 3 is a schematic longitudinal sectional view similar to FIG. 2 of a further embodiment of the process of the invention.

In such cases it is more advantageous to provide a heat insulation layer in the guide band groove, which is indicated with the reference number 4 in FIG. 3. This heat insulating layer 4 can, for example, be mounted by spraying or lacquering the surface of the guide band groove 6, or also by inserting a piece of material in the guide groove 6. It has been found advantageous to use a material with good sliding properties for the heat insulating layer 4, for example polytetrafluoroethylene.

The carrying out of the process proper with the injection of the synthetic material into the ring chamber 6 is carried out in the above-described manner, by again providing a large heat energy flow from the synthetic material of the guide band 3 to the injection molding tool 2, whereby only a small heat flow from the synthetic material from the guide band 3 to the projectile 1 results and thereby the afore-described effects occur.

It is evident that such a heat insulating layer 4 can also be provided in the guide band groove 6, when no precautionary measures relative to the projectile are to be carried out, in order to support in this manner the heat energy flow from the injected synthetic material into the injection molding tool 2.

With the afore-described process one obtains in a simplified but effective manner projectiles having sliding-through unitary guide bands, without the complex and difficult to control assembly techniques of the state of the art, which depend on a controlled expansion of the guide band and a shrinkage of the guide bands in the guide band groove by controlled relaxation. The utilization of costly projectile types having additional separating planes at the level of the guide band groove with the maintenance of high precision tolerances is also dispensed with. In contradistinction thereto, in the process of the invention the measurements of the gap 5 between the guide band 3 and the projectile body 1 can be adjusted by means of adjustment of the process parameters, for example the selection of synthetic materials, volume of the ring chamber and the formation of the temperature gradients.

In a further embodiment of the invention the guide band 3 is made out of a fiber-reinforced synthetic material, thereby a release of the guide band 3 from the projectile 1 during flight is avoided.

A release of the guide band 3 can also be circumvented in a further embodiment of the invention by providing the guide band groove 6 with rear edges.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A process for producing guide bands of deformable material for flight-stabilized projectiles, which guide band is mounted in an annular groove of the projectile and is adapted to slide through the gun barrel when the projectile is propelled therethrough, which process comprises the following steps:

fixing the projectile in an injection molding device by contacting relatively small contact surfaces of the projectile;

directly injecting in to the space defined between the injection molding device and the annular groove synthetic material for forming the guide band, said injection molding device having a plurality of injection molding gates which are evenly spaced around the injection molding device, through which the synthetic material is injected; and adjusting and maintaining a temperature gradient between the projectile and injection molding device by having a heat insulating layer disposed between the projectile and the injection molding device for fixing the projectile therein, so that the injection molding device is substantially colder than the projectile.

2. The process for producing guide bands of deformable material for flight-stabilized projectiles, as defined in claim 1, wherein there is provided prior to the injection of the synthetic material into the space defined between the injection molding device and the annular groove a heat-insulating layer in the annular groove.

3. The process for producing guide bands of deformable material for flight-stabilized projectiles, as defined in claim 2, wherein the heat-insulating layer is made of polytetrafluroethylene having good gliding properties.

4. The process for producing guide bands of deformable material for flight-stabilized projectiles, as defined in claim 3, wherein the guide band is made of a fiber-reinforced synthetic material which prevents the release of the guide band while the projectile is in flight.

* * * * *